Patented July 25, 1939

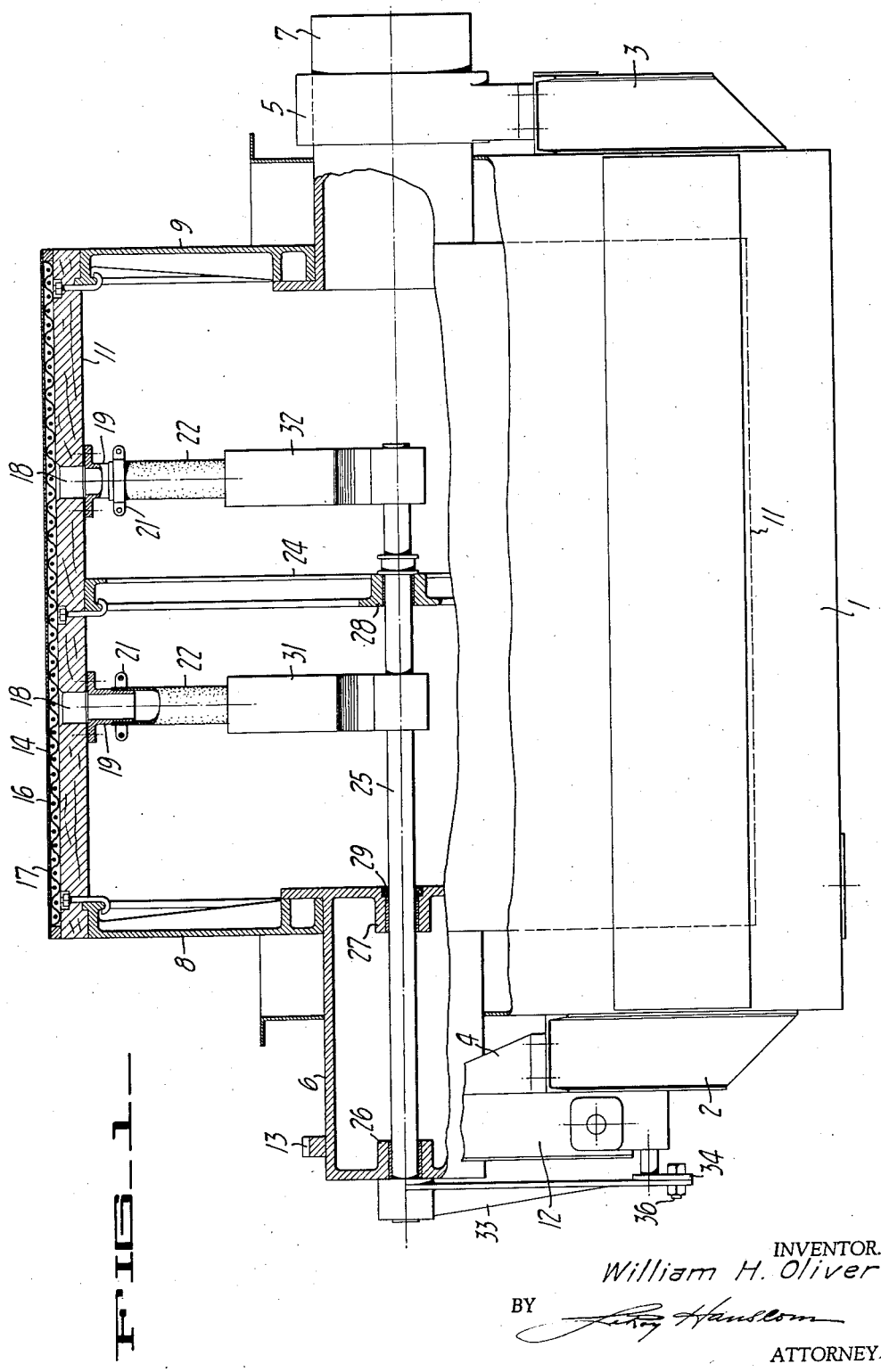

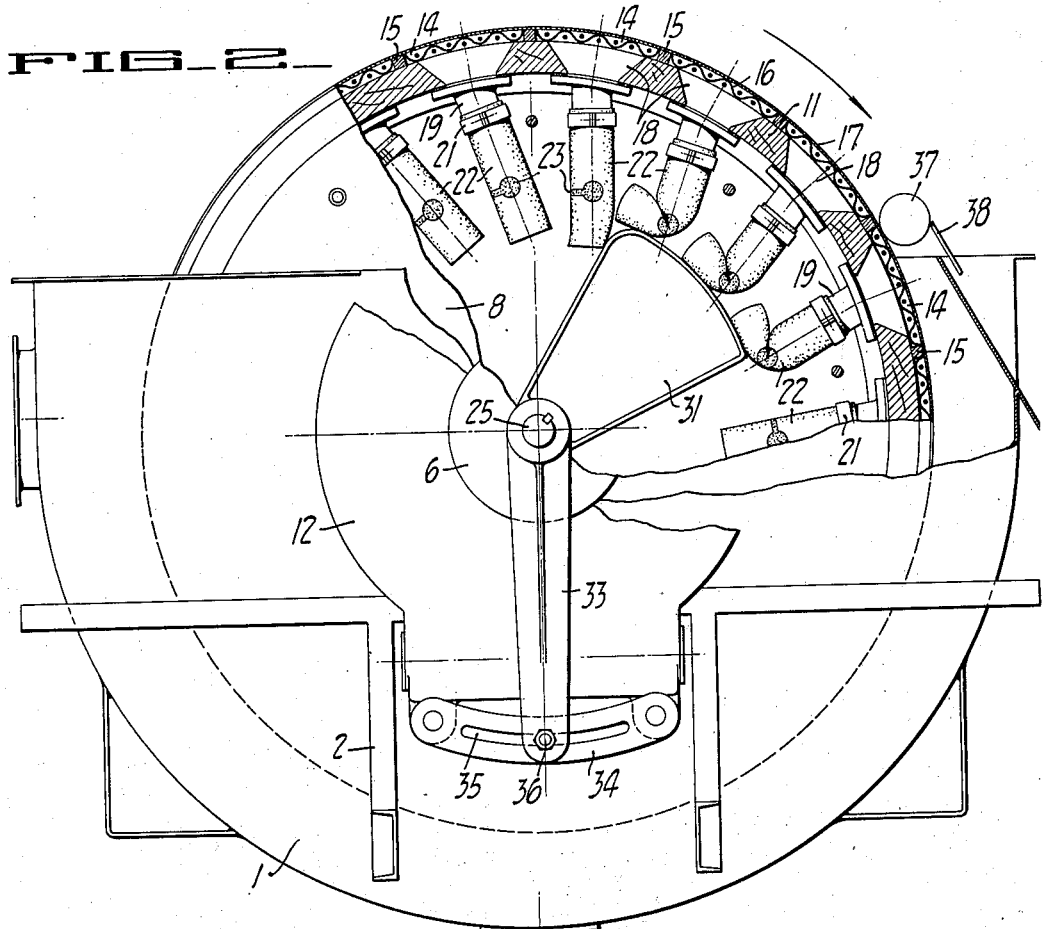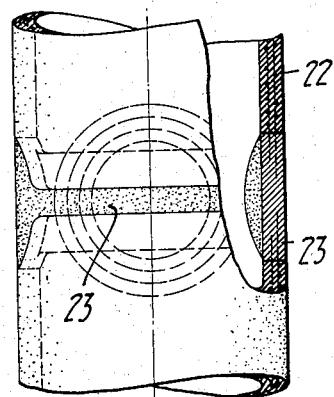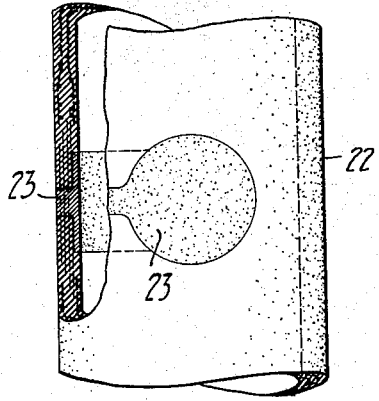

2,167,159

UNITED STATES PATENT OFFICE 2,167,159

FILTER

William H. Oliver, Oakland, Calif., assignor to Oliver United Filters Incorporated, San Francisco, Calif., a corporation of Nevada Application April 5, 1937, Serial No. 135,051

10 Claims. (Cl. 210—202)

This invention relates to filters, and particularly to filters of the continuous rotary drum type. More particularly, this invention is an improvement in the type of filter shown in the U. S. patent to Young No. 2,052,156 of August 25, 1936, wherein communication between the filtrate compartments of the drum and the interior of the drum is established by means of individual valves associated with ports formed in the floor of each filtrate compartment.

In general, the object of this invention is the provision of a cam operated valve for controlling the pressure within the individual filtrate compartments of a sectionalized filter upon relative movement of the filtrate compartment and cam.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

In the accompanying drawings:

Figure 1 is a side elevation partly in section of a continuous rotary drum filter embodying the objects of my invention.

Figure 2 is an end elevation of the filter shown in Figure 1 with parts broken away in order to illustrate more clearly the means used for establishing and cutting off communication between the filtrate compartments and the interior of the drum.

Figure 3 is a fragmentary detail with parts broken away of that portion of the flexible tubes shown in Figures 1 and 2 which is adapted to be bent upon itself.

Figure 4 is a fragmentary detail with parts broken away of the tube shown in Figure 3, but taken at right angles to the view as shown in Figure 3.

As shown in Figures 1 and 2, the objects of my invention may be embodied in a continuous rotary drum filter comprising a tank 1, to the ends of which brackets 2 and 3 are welded. Mounted on brackets 2 and 3 are bearings 4 and 5, within which are journaled hollow trunnions 6 and 7. Welded to the inner ends of the trunnions 6 and 7 are the heads 8 and 9 of a wood stave drum 11. Rotation of the drum is effected by a suitable gear train disposed in the gear housing 12 adapted to rotate the gear wheel 13 secured to the trunnion 6. The entire interior of the drum may be maintained under subatmospheric pressure by connecting the outer end of the trunnion 7 in any suitable manner with a vacuum pump or barometric leg.

The outer surface of the drum 11 is divided into longitudinally extending filtrate compartments 14 by division strips 15 secured to the drum. Disposed within the compartments 14 are drainage screens or members 16. Secured over these drainage members and the division strips 15 is a filter medium or cover 17 which if desired may be held in place by a spiral wire winding in the well known manner. Formed in the floor of each of the compartments 14 is a port 18 which serves to establish communication between each of the filtrate compartments and the interior of the drum. The ports 18 of adjacent filtrate compartments may be staggered, that is, the ports of one filtrate compartment may be spaced longitudinally with respect to the ports of the filtrate compartments on either side, or if desired each filtrate compartment may be provided with several ports 18. Secured in registration with each of the ports 18 is a fitting 19, and clamped to each of these fittings by a hose clamp 21 is a section of flexible tubing 22. As shown in Figures 3 and 4, these sections of tubing are preferably made of reinforced rubber and are provided intermediate their ends and on their trailing side with a strip of rubber 23 having a greater degree of resiliency and flexibility than the body of the tubes. The strip 23 terminates in diametrically opposed discs, and the entire structure is vulcanized so as to form an integral tube capable of being bent upon itself and sealed along the strip 23.

Secured to the interior of the drum 11 intermediate its ends is a spider 24. Extending through the trunnion 6 and into the drum 11 is a rod 25 journaled in bearings 26, 27, and 28 formed respectively in the trunnion 6 and in the spider 24. The bearing 27 is provided with a suitable stuffing box 29. Secured to the rod 25 in the locus of the tubes 22 is a pair of spaced cams 31 and 32, the upper cam surface of which is arranged to engage the free ends of each of the tubes 22 once during each revolution of the drum 11. To the outer end of the rod 25 is keyed an adjusting arm 33, the lower end of which is adapted to register with an arcuate bracket 34 secured directly or indirectly to the tank 1. The bracket 34 is provided with an arcuate slot 35 adapted to accommodate a bolt 36 by which the adjusting arm 33 may be secured in any predetermined angular position. Preferably the adjusting lever 33 is so adjusted that the cams 31 and 32 engage the tubes 22 which are in communication with filtrate compartments 14 at the approximate point of discharge. The reason for this is that since the entire interior of the drum 11 is maintained under subatmospheric pressure, difficulty is experienced in discharging the cake formed on the filter medium unless the vacuum is cut off from the filtrate compartments being discharged. Discharge of the cake may be effected by a discharge roll 37 and a scraper 38 as shown in Figure 2, or by any other suitable discharge mechanism, such as the suction discharger shown in the U. S. Hillier Patent 1,914,742 of June 20, 1933. Since in the operation of the filter illustrated in the drawings, the interior of the drum is maintained under subatmospheric pressure, while the exterior of the drum is under atmospheric pressure, it will be seen that this differential pressure will aid in choking or sealing the tubes 22 once they have been bent upon themselves by the cams 31 or 32. In other words, when the tubes 22 are bent upon themselves, this differential pressure will tend to inflate the tubes, thereby furthering the sealing action of the cams.

As shown in Figure 2, the cam surfaces of the cams 31 and 32 may be of such dimensions that several of the tubes 22 are engaged at one time. And the cam surfaces of the cams 31 and 32 should be so related with respect to the strips 23 that the tubes 22 are made to bend upon themselves along these strips. The purpose of the strips 23 is to permit the tubes 22 to bend upon themselves without undue wear at this point and in such a manner that a water-tight seal can be effected.

Filters of this type are ordinarily used where high capacity is required, such as in the paper industry, and in these industries, where the filtrates are frequently of an acid character, the entire exposed surfaces of the filter are oftentimes rubber coated in order to withstand the corrosive action of the acids. A filter constructed as above described lends itself very readily to rubber covering. The tubes 22, which in conjunction with the cams 31 and 32 operate as automatic valves, can be easily replaced by taking off the clamps 21, stripping the old tubes 22 from the fittings 19, and substituting new tubes. Furthermore, valves so constructed do not require the accurate machine work which is required in the valves shown in the Young Patent 2,052,156 in order to obtain the close clearances which are necessary for maintaining the vacuum within the drum and cutting off communication between any desired compartment and the interior of the drum.

Although the cam operated flexible tube valve of my invention has been particularly illustrated in connection with a filter of the continuous rotary drum type, it may be utilized with equal effect on other types of filters, such as endless belt filters and may be used for venting the individual filtrate compartments of a plural compartment filter to atmosphere rather than for the purpose specifically illustrated.

I claim:

1. A rotary filter comprising: a plurality of filtrate compartments; a section of open ended flexible tubing secured to and communicating with each of said compartments; and a cam secured in the locus of said tubing and arranged to close said tubing upon relative movement between said filtrate compartments and said cam.

2. A rotary drum filter comprising: a plurality of filtrate compartments; an open ended section of flexible tubing connected to and in communication with each of said compartments; a cam in the locus of and adapted to close the free ends of said sections of flexible tubing; and means external to said filter for adjusting the position of said cam.

3. A rotary drum filter comprising: a drum provided with a plurality of successive filtrate compartments; an open ended section of flexible tubing secured to and communicating with each of said filtrate compartments and depending into said drum; a shoe secured in the locus of and arranged to close said tubing upon relative movement between said filtrate compartments and said shoe; and means for causing relative movement between said tubing and said shoe.

4. A rotary drum filter comprising: a drum divided into a plurality of filtrate compartments; a port in the floor of each of said compartments; a section of flexible tubing secured to the floor of each compartment in registration with the port therein and extending into said drum; and means secured within said drum in the locus of said sections of tubing for bending each section of tubing upon itself and closing it during each revolution of said drum.

5. A rotary drum filter comprising: a drum rotatably supported within a tank by hollow trunnions; a plurality of contiguous filtrate compartments formed on the outer surface of said drum; a port in the floor of each compartment; a depending section of flexible tubing secured to said drum in registration with each of said ports; a rod extending through one of said trunnions into said drum; cam means secured to said rod within said drum in the locus of said sections of flexible tubing for bending each of said sections of tubing upon itself during each revolution of said drum; and means secured to the outer end of said rod for locking it in a predetermined angular position.

6. A filter such as defined in claim 1, characterized in that said sections of flexible tubing are provided intermediate their ends with an insert of material of greater flexibility than the body of said sections of tubing.

7. A filter such as defined in claim 1, characterized in that said sections of flexible tubing are provided intermediate their ends with a peripherally extending insert of material terminating in enlarged portions and having a greater flexibility than the body of said sections of tubing.

8. A rotary filter comprising: a plurality of filtrate compartments; a section of open ended flexible tubing secured to and communicating with each of said compartments; and stationary means secured in the locus of said tubing and arranged to close said tubing upon relative movement between said filtrate compartments and said stationary means.

9. A filter comprising: a filter cell arranged to travel in a closed path; a section of flexible tubing secured to and communicating with said cell; a shoe secured in the locus of said tubing and arranged to close said tubing upon relative movement between said cell and said shoe; and means for causing relative movement between said shoe and said tubing.

10. A continuous filter comprising: a plurality of filtrate compartments arranged to travel in a closed path; a section of open ended flexible tubing secured to and communicating with each of said compartments; a shoe secured in the locus of said tubing and arranged to close said tubing upon relative movement between said filtrate compartments and said shoe; and means for causing relative movement between said tubing and said shoe.

WILLIAM H. OLIVER.